UNITED STATES PATENT OFFICE 2,008,536

PROCESS FOR THE PRODUCTION OF HYDROGENATED BENZO-ISO-TETRAZOLES

Emil Wolf, Budapest, Hungary, assignor to the firm Chinoin Gyógyszer-Es Vegyészeti Termékek Gyara R. T. (Dr. Kereszty & Dr. Wolf), Ujpest, Hungary No Drawing. Application July 17, 1934, Serial No. 735,632. In Hungary July 24, 1933

2 Claims. (Cl. 260—44)

Benzo-iso-tetrazole according to the formula

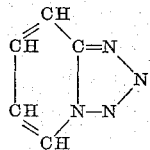

(see R. G. Fargher and R. Furness, Chem. Centralblatt, 1915. II. page 413) is hardly soluble at all in water and is therefore of little value for therapeutical purposes. It has been found, that from benzo-iso-tetrazole or from the alkyl derivatives (substituted in the carbon) of benzo-iso-tetrazole, it is possible to produce, by means of catalytic hydrogenation, hydrogenated tetrazoles, which are more readily soluble in water and possess valuable therapeutical properties. A preferable method for carrying the catalytic hydrogenation into effect is to employ noble-metal catalyzers such as platinum or palladium. Di-hydro-benzo-iso-tetrazoles or tetrahydro-benzo-iso-tetrazoles will be obtained according to whether hydrogenation is discontinued after one mol of hydrogen has been absorbed, or whether it is continued until the absorption of hydrogen ceases (which will be the case when 2 mols of hydrogen have been absorbed.)

The starting materials can be produced according to known processes (e. g. according to the Fargher and Furness proccess). If, in the Fargher and Furness process, there are employed, instead of pyridyl-hydrazine, pyridyl-hydrazines having alkyl groups substituted in the pyridine nucleus, the corresponding alkyl-benzo-iso-tetrazoles, will be obtained, which are suitable as starting materials for the process according to the present invention. Thus from 5-methyl-pyridyl-hydrazine, for instance, there will be obtained methyl-benzo-iso-tetrazole according to the formula

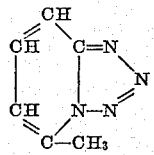

the melting point of which is 152 to 153° C.

Examples

1. In an atmosphere of hydrogen, 100 grams of benzo-iso-tetrazole dissolved or dispersed in alcohol are agitated with a palladium catalyzer. After the absorption of hydrogen has ceased, the mixture is filtered, the alcohol is evaporated and the residue distilled in vacuo. About 90 grams of tetramethylene-tetrazole will be obtained, having a melting point of about 115° C.

2. In an atmosphere of hydrogen, 120 grams of benzo-iso-tetrazole dissolved or dispersed in alcohol are agitated with a palladium catalyzer. After one mol of hydrogen has been absorbed, the mixture is filtered, the filtrate is boiled down, and the residue is re-crystallized. About 95 grams of dihydro-benzo-iso-tetrazole will be obtained, having a melting-point of 96 to 98° C.

3. 134 grams of methyl-benzo-iso-tetrazole (melting point 152 to 153° C) are hydrogenized by means of hydrogen, with the aid of a palladium or platinum catalyzer. After the absorption of hydrogen has ceased, the filtrate is boiled down and the residue is re-crystallized. About 100 to 120 grams of tetrahydro-methyl-benzo-iso-tetrazole will be obtained, having a melting point of 92 to 94° C.

4. 148 grams of dimethyl-benzo-tetrazole (melting point 128 to 129° C.), produced in the known manner from 2.4-dimethyl-α-hydrazino-pyridine, suspended in 2 litres of alcohol are reduced by means of hydrogen, with the aid of 5 grams of $PdCl_2$ precipitated on animal charcoal till, (theoretically) 2 mols of hydrogen have been absorbed; after removing the catalyzer and evaporating the alcohol, the residue is purified either by distillation or recrystallization or by way of the sublimate-double salt. The yield is nearly 100 grams of dimethyl-tetramethylene-tetrazole. Melting point 95 to 97° C.

The alkylated tetrazoles produced according to the present process, particularly those containing more than one alkyl substituent show quite unexpectedly a substantially increased therapeutical effect as compared to the non-alkylated tetrazole.

What I claim is:

1. A process for the production of hydrogenated benzo-iso-tetrazoles, comprising the hydrogenating of benzo-iso-tetrazoles of the general formula

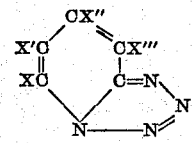

—in which X, X', X", and X''' stand for a member of the group consisting of hydrogen and alkyl-groups—, in the presence of hydrogenation metal catalyzers of the platinum group.

2. A process for the production of hydrogenated benzo-iso-tetrazoles, comprising the hydrogenating of benzo-iso-tetrazoles of the general formula

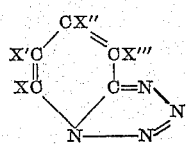

—in which X, X′, X″, X‴ stand for a member of the group consisting of hydrogen and alkyl-groups—, in the presence of hydrogenation metal catalyzers of the platinum group and discontinuing the hydrogenation as soon as one mol of hydrogen is added to each mol of the starting material.

EMIL WOLF.